United States Patent [19]
Jacobs et al.

[11] 3,810,442
[45] May 14, 1974

[54] MILKING SYSTEM

[76] Inventors: Hubert Hudson Jacobs; Virginia Michael Jacobs, both of 1035 Jacobs Rd., DeLand, Fla. 32720

[22] Filed: Apr. 2, 1973

[21] Appl. No.: 347,162

[52] U.S. Cl............... 119/14.03, 119/14.04, 119/28
[51] Int. Cl............................................... A01k 1/00
[58] Field of Search .......... 119/14.04, 14.03, 27, 28

[56] References Cited
UNITED STATES PATENTS
3,460,515 8/1969 Page et al. ...................... 119/14.04
3,282,250 11/1966 Cain............................... 119/14.04

*Primary Examiner*—Hugh R. Chamblee
*Attorney, Agent, or Firm*—Duckworth, Hobby & Allen

[57] ABSTRACT

A milking parlor apparatus and method for milking large numbers of cows using a pair of batch loaded reciprocating shuttling platforms in which one platform is batch loaded and moved to a milking station where the cows are milked while a second parallel platform is being loaded. The second platform is moved to the milking station and the first platform returned to the original loading station and unloaded and reloaded, thereby delivering a continuous supply of cattle for milking. The milking station can utilize one operator for milking the cows on both shuttle platforms and the system avoids any electrical connections on the platforms.

22 Claims, 15 Drawing Figures

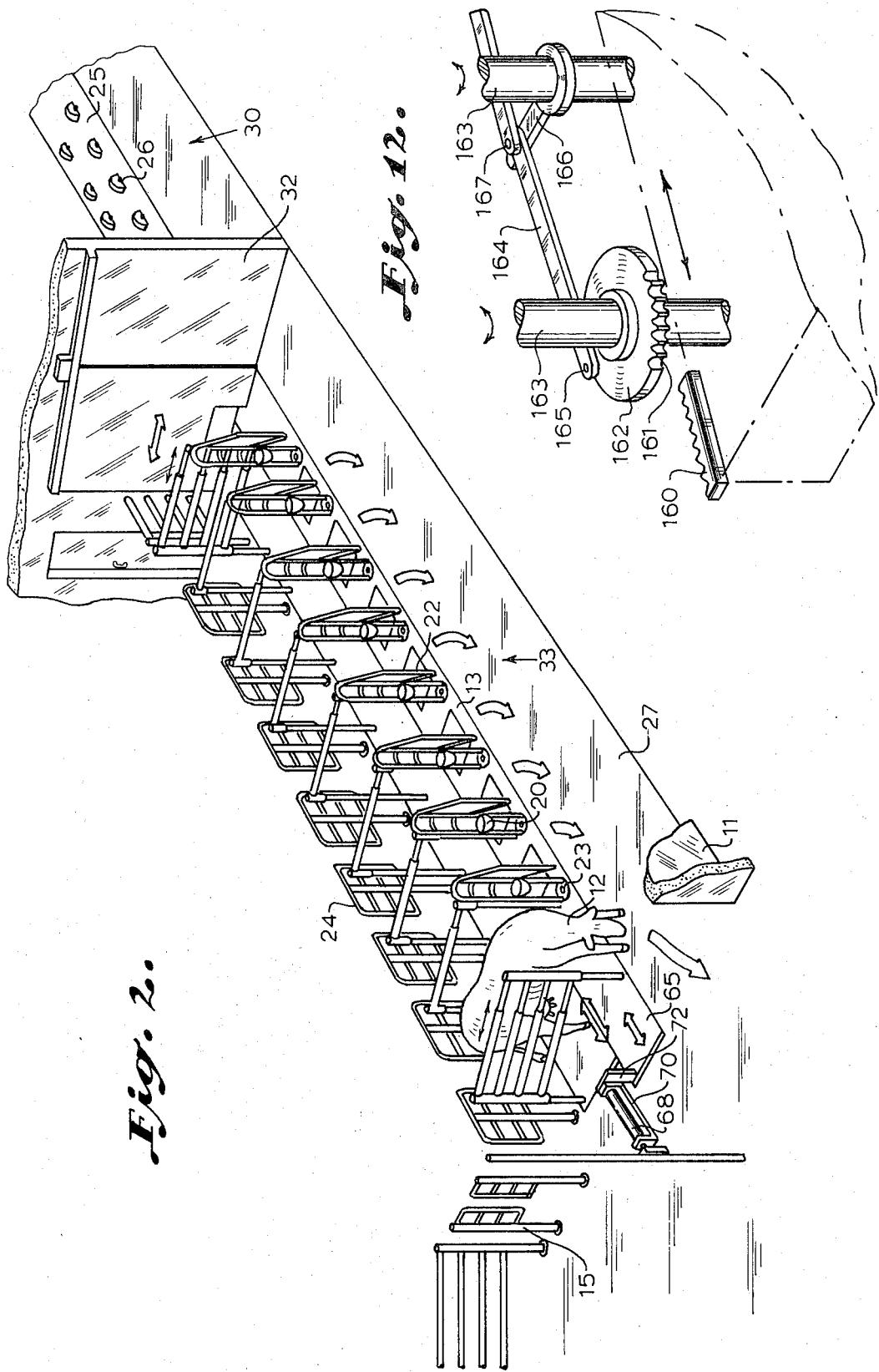

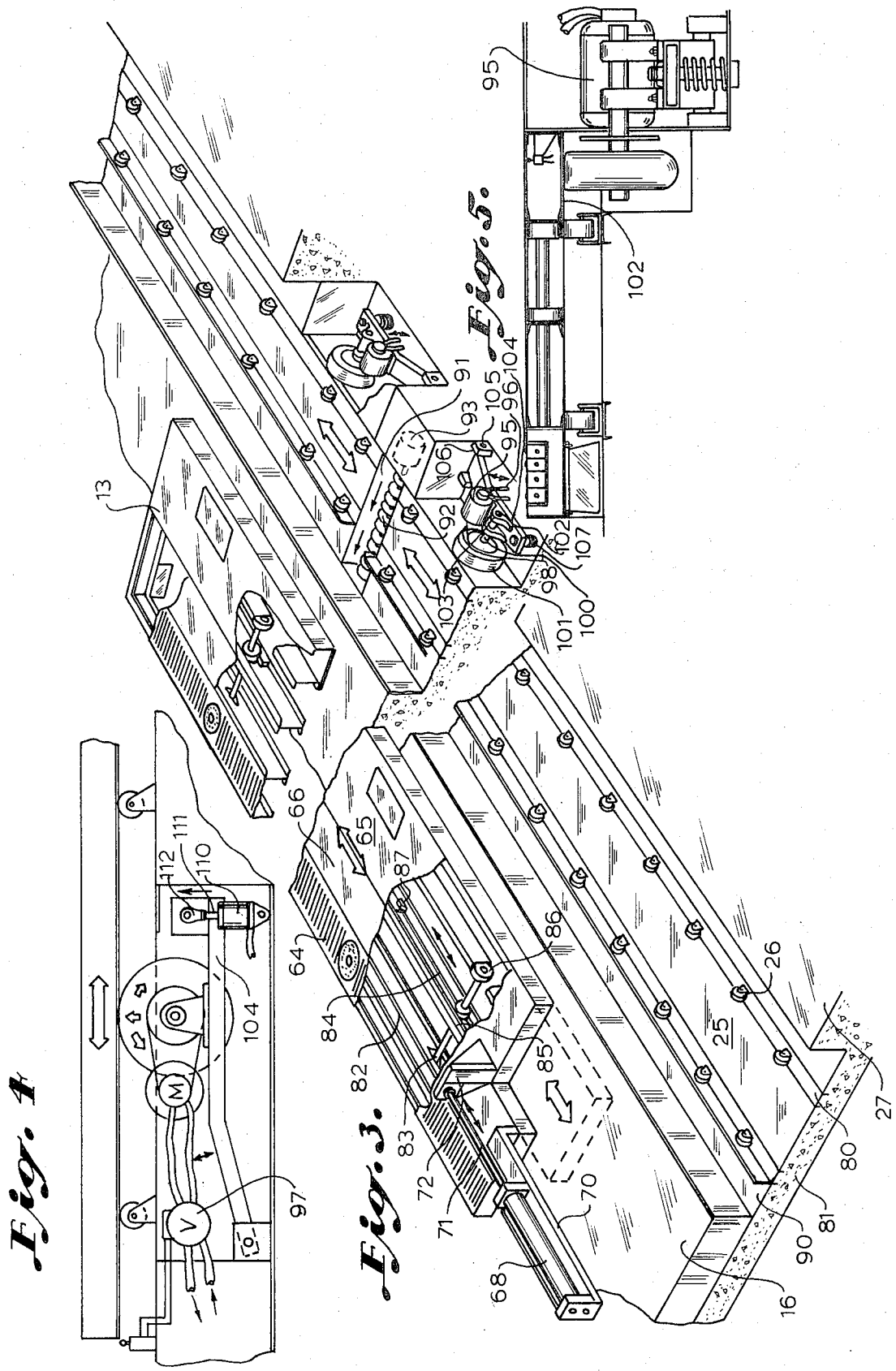

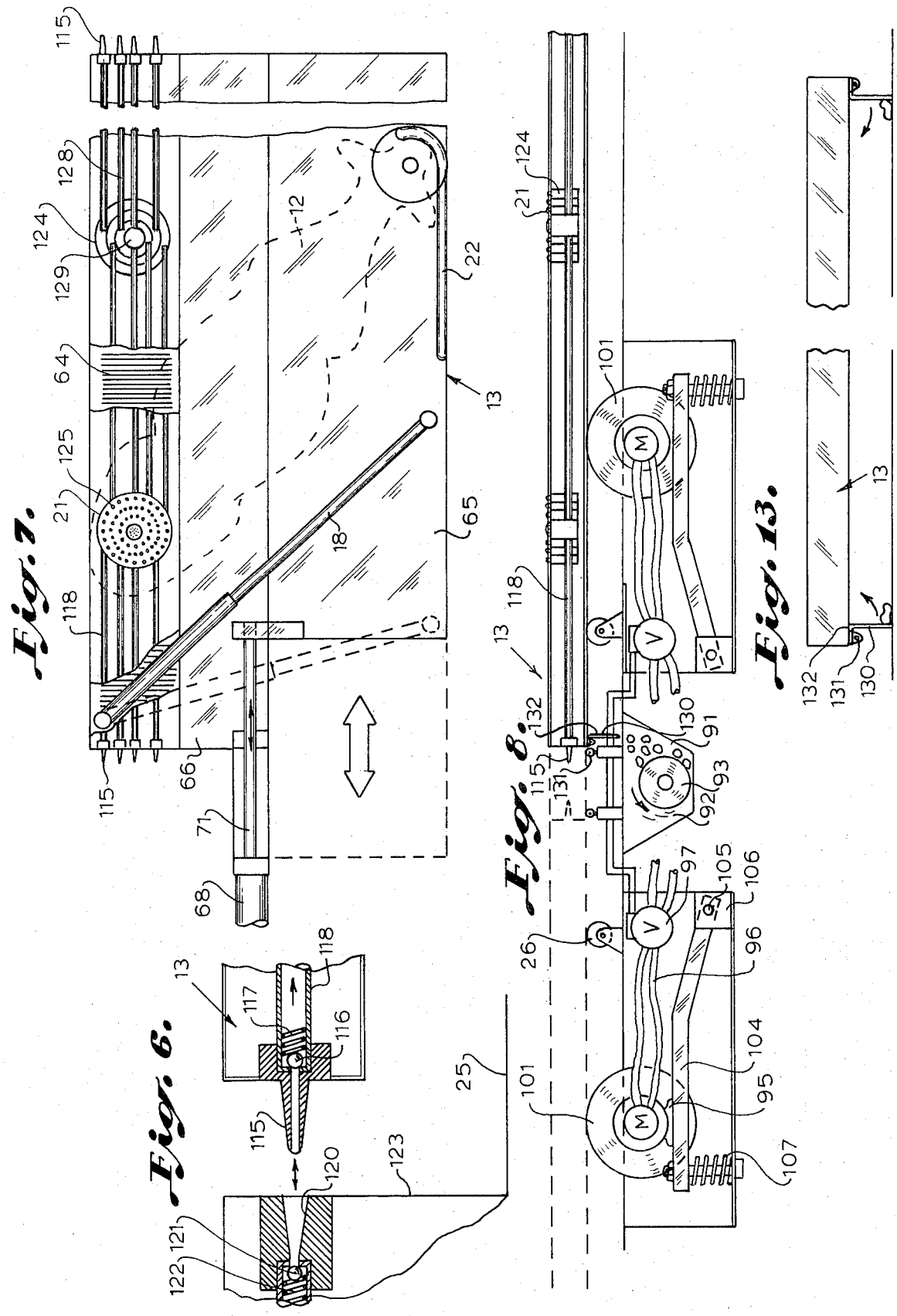

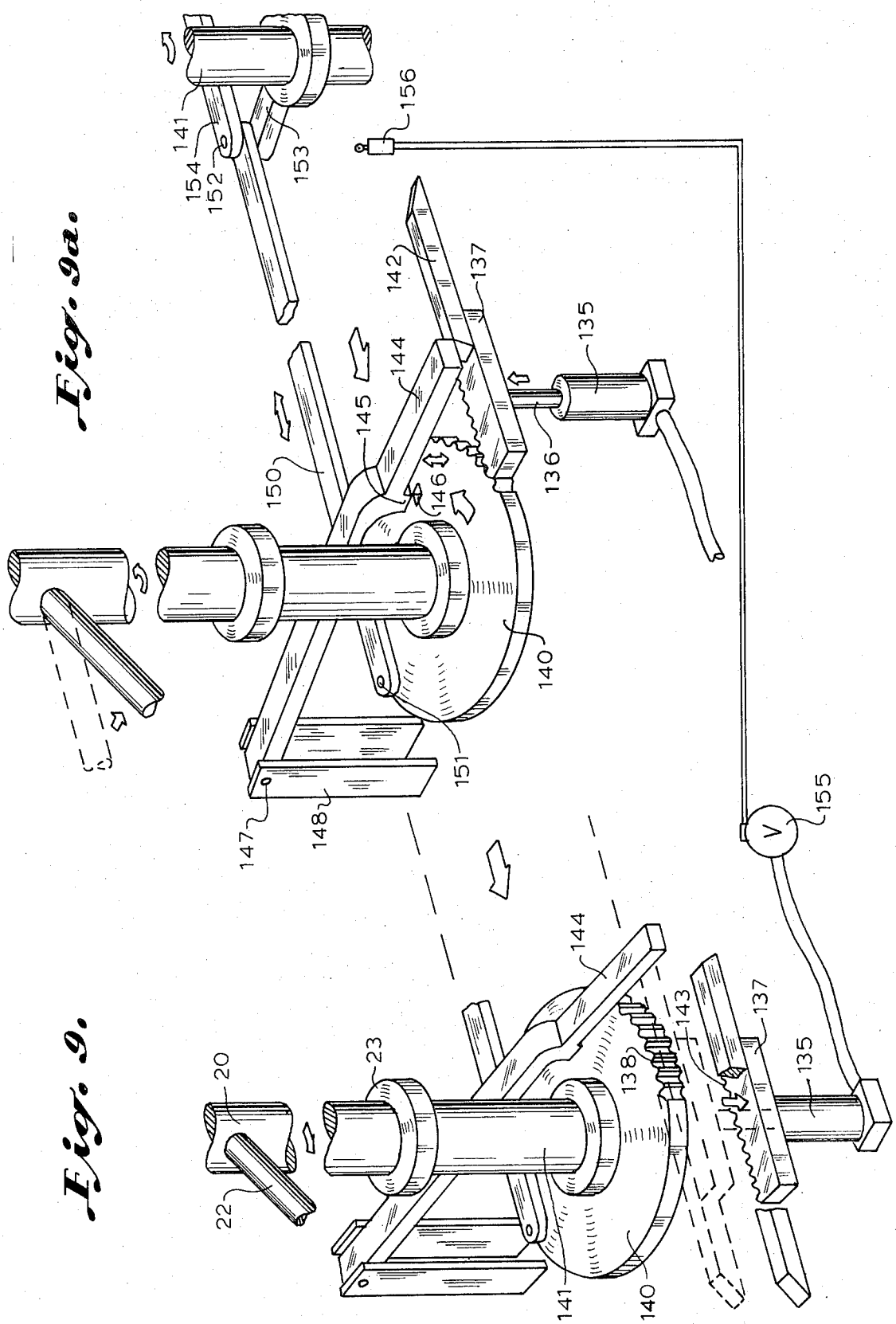

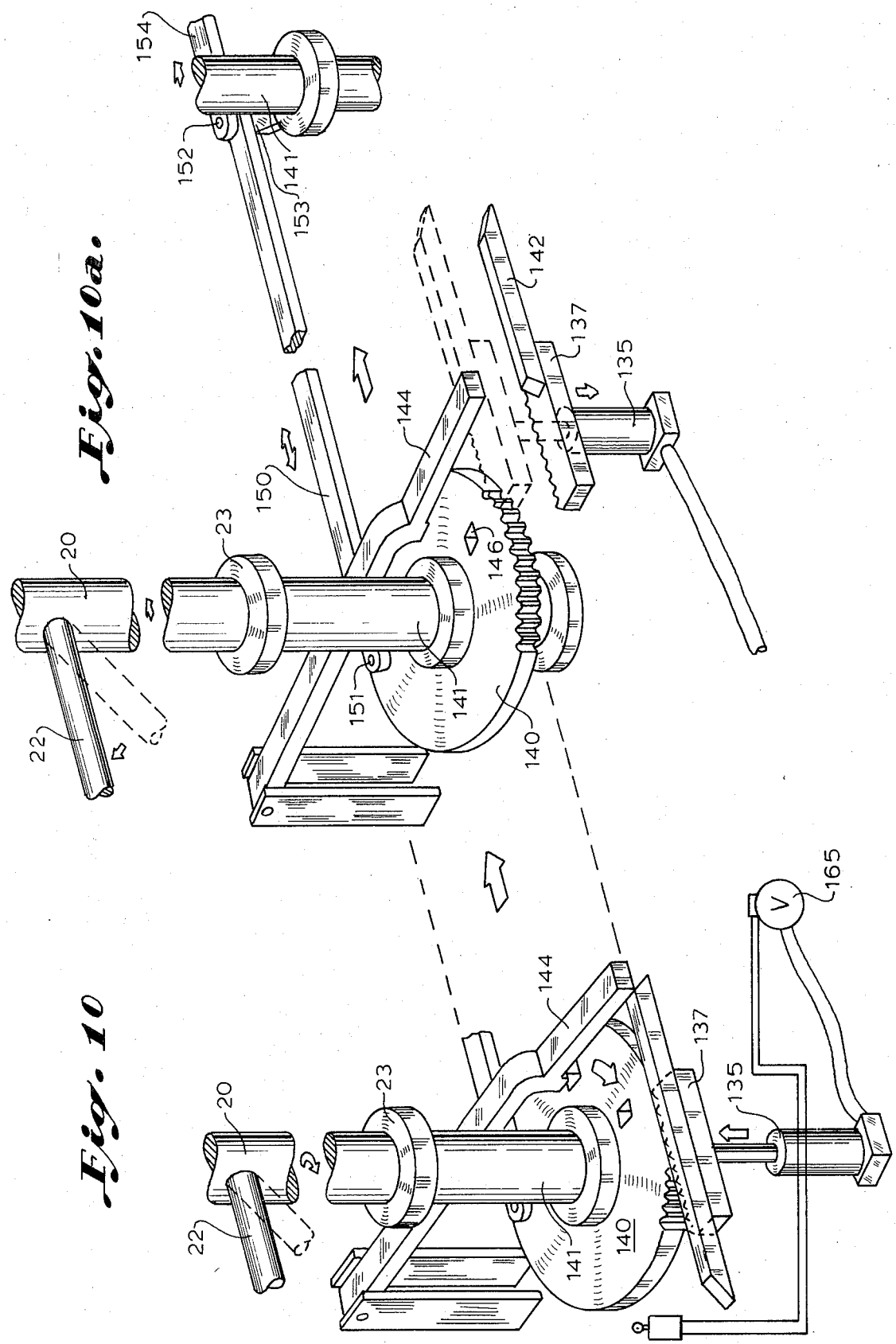

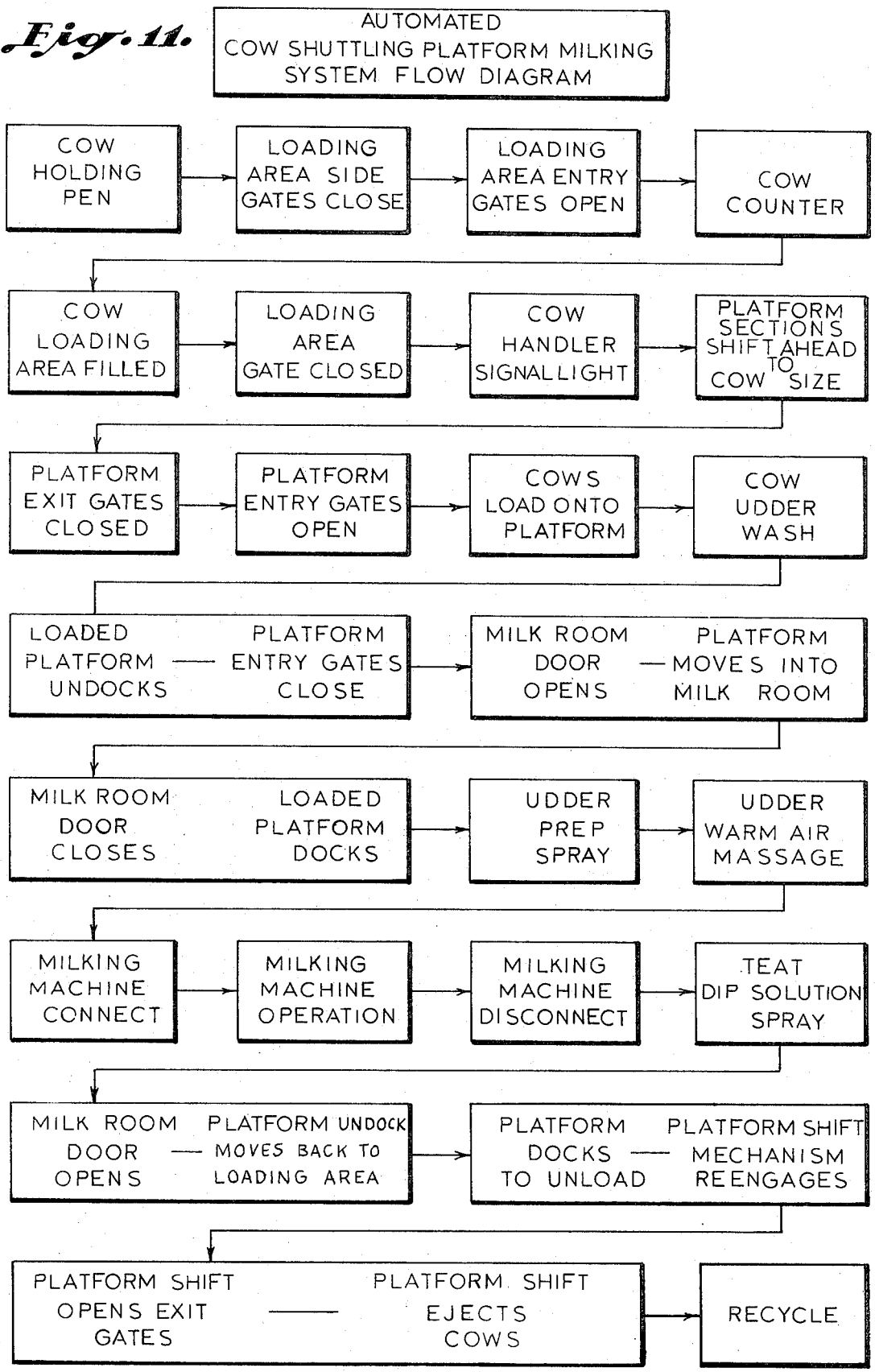
Fig. 11. AUTOMATED COW SHUTTLING PLATFORM MILKING SYSTEM FLOW DIAGRAM

MILKING SYSTEM

BACKGROUND OF THE INVENTION

The present invention relates to milking systems and especially to a milking parlor for milking large numbers of cows in a safe and efficient manner.

Large dairies have progressed over the years from the milking of cows by hand and using a milking stool, to mechanized milking machines used in substantially mechanized dairy parlors. In a typical operation a mechanized milking machine is connected to each cow by connecting teat cups to the cows. A cluster of teat cups is connected to milk lines which are connected to pulsators to milk the cow. The milk lines are connected to milk pails for accumulating the milk from the milking operation. In small operations this may be performed in cowsheds with the cows lined up side by side feeding from a manger while being milked and frequently having a liquid manure gutter for collecting the cow manure and moving it from the cowshed for disposal.

Larger cow barns generally have stalls for confining the cows in a predetermined manner arranged side by side in rows facing the feedway at one end and the manure removal system at the opposite end.

In more modern facilities various types of systems have been provided for loading cows for movement between different positions during the feeding and milking operations. One class of system performing this function uses a carousel platform for the milking station in which each cow is loaded upon a circular platform then restrained in position by stalls placed on the platform so that an operator properly located can connect teat cups to each cow for milking the cow being held in the proper position by the stalls. Typical prior art may be seen in U.S. Pat. No. 3,095,854 and U.S. Pat. No. 3,103,912. Another milking parlor taught in the past would utilize a series of endless conveyors supporting stalls which would move down one side, or make a U-turn, come down the opposite side and make another U-turn to start over again, such as illustrated in U.S. pat. No. 2,358,000. Finally, U.S. Pat. No. 3,402,699 provides for a system for milking cows in which the cows are put into stalls on a moving platform in which feed is delivered automatically to the travelling stalls. The milking operation is performed by milking units which travel on an adjacent overhead track at the same rate as the moving platform.

Dairy parlors have generated numerous problems, the more important ones of which include the time-consuming operation of loading one cow at a time on to a moving parlor and then unloading one cow at a time. It is one object of this invention to overcome this problem by utilizing an alternately shuttling platform which loads in batches allowing the operator to connect up one set of cows while the opposite shuttling platform is being loaded. Electrical shock has also been a problem in dairy parlors inasmuch as a considerable amount of liquids are being handled and the use of electrical driving and actuating units having presented shock hazards. This is especially true where cows are being carried on moving platforms which are not grounded and which require some means for actuating the unit. In the present system electrical drives are avoided by having the actuating units for the platforms separate from the platform and by not requiring any electrically operated units directly on the platform.

SUMMARY OF THE INVENTION

The present invention relates to a method and apparatus for milking cows in a milking parlor. The method provides for directing a plurality of cows onto a movable shuttling first platform then moving the platform in one direction between a loading position and a miking position at the milking station where the cows are milked. A plurality of cows are then directed onto a second movable shuttle located parallel to the first movable shuttle. The second movable shuttle platform is then moved from a loading position to a milking position. The first shuttle platform is returned to the loading position upon completion of the milking operation where the milked cows are unloaded and another batch of cows loaded while the cows on then second shuttle are being milked. The method includes washing the udders and providing an air massage.

The milking apparatus includes the first movable shuttle platform for loading the cows at the loading position and moving to a milking position along with a second parallel movable shuttle platform having loading and milking positions and having a plurality of stalls upon each platform for holding cows in a feeding and milking position. Means are provided for batch-loading the cows from a holding unit onto the platforms and for moving each of the platforms back and forth between loading and unloading and milking positions. The milking station is located adjacent to the milking positions so that a single operator can milk the cows on each platform alternately. An udder sprayer is provided on the platforms along with an udder air massage. A system for signalling the loaded platform, actuating the movement of the platforms and the gates for loading and unloading individual stalls on the platforms is also provided. In addition the milking station can be provided with a movable milking stool for the operator's use.

BRIEF DESCRIPTION OF THE DRAWINGS

Other objects, features and advantages of this invention will be apparent from a study of the written description and the drawings in which:

FIG. 2 is a perspective view of a portion of the milking parlor in accordance with FIG. 1 showing the unloading operation;

FIG. 3 is a cutaway perspective view of the operation of the shuttle platforms illustrated in FIGS. 1 and 2;

FIG. 4 is a side sectional view of a portion of the apparatus in accordance with FIGS. 1 through 3 illustrating the driving mechanism for the platform;

FIG. 5 is an end sectional view of the drive mechanism in accordance with FIG. 4;

FIG. 6 is a cutaway sectional view of the coupling for coupling supply lines to the udder sprayer;

FIG. 7 illustrates a top sectional view of a portion of the apparatus showing the udder sprayer;

FIG. 8 is a side sectional view of the operation of the platform between driving wheels;

FIG. 9 and 9A illustrate perspective views of the gate actuating mechanism;

FIG. 10 and 10A illustrate perspective views of the second gate actuating mechanism of FIGS. 9 and 9A in a second position for operating a plurality of gates;

FIG. 11 is a flow diagram of the method of operating the milking system of FIGS. 1 – 9;

FIG. 12 is a perspective view of the entrance gates actuation mechanisms; and

FIG. 13 is a sectional view of the manure sweepers.

DESCRIPTION OF THE PREFERRED EMBODIMENT

Figure 1:
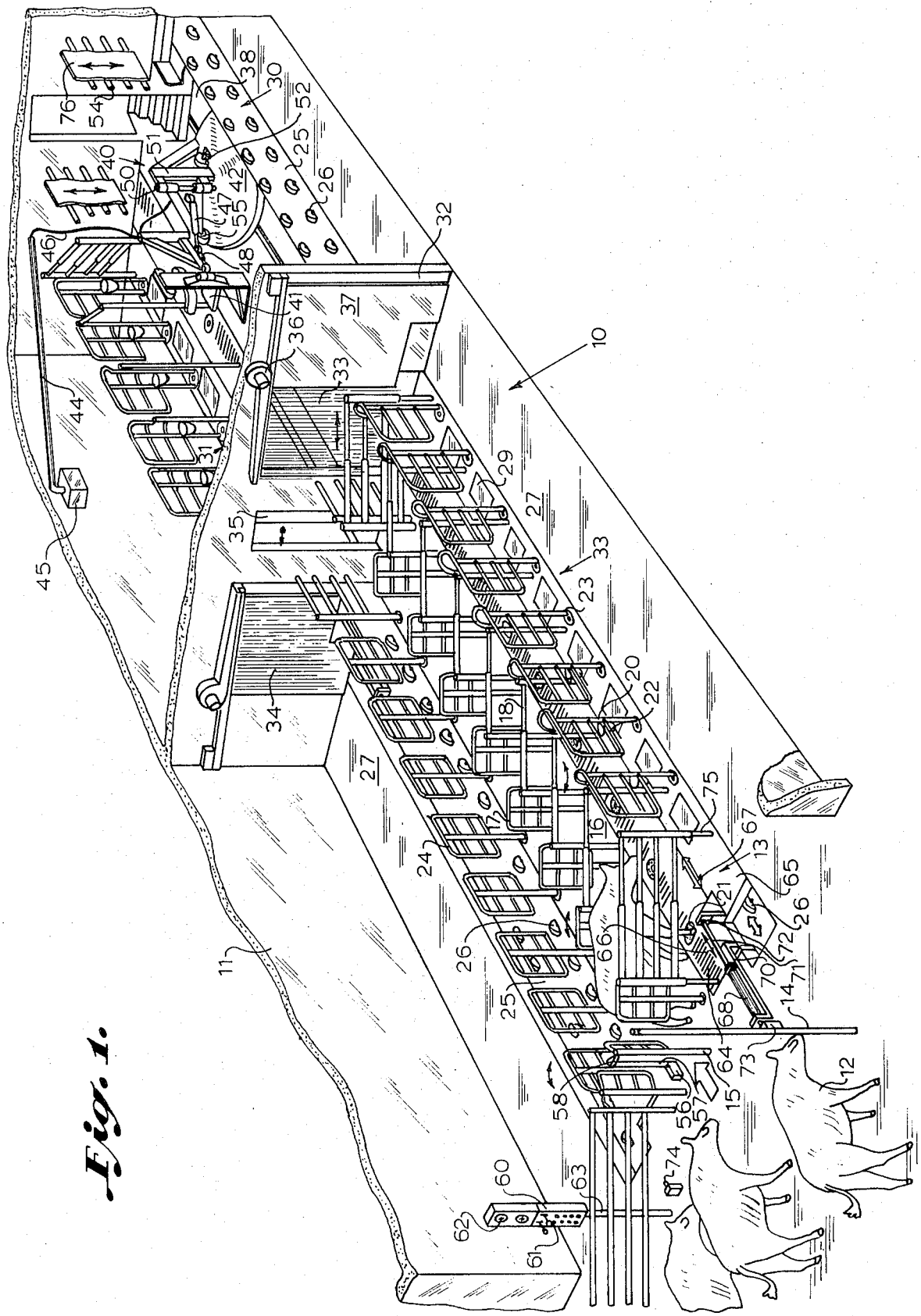
FIG. 1 is a perspective view of a preferred embodiment of a milking parlor in accordance with the present invention.

Referring now to the drawings and especially to FIG. 1, a milking parlor in accordance with the present invention is illustrated as 10 located in building 11 and having cows 12 being loaded onto a movable platform 13 from a holding pen formed by rails 14. Cows 12 are directed through gates 15 which gate can be opened for the cows to walk onto a fixed platform 16. Once on the platform 16, a plurality of rotatable gates 17 have been rotated to direct the cows into a plurality of stalls formed by railings 18 for holding each cow in a predetermined position with a feed bucket 20 at one end and an udder spray 21 at the opposite end. Feed bucket 20 is attached to a gate 22 which rotates on a base disc 23 to allow the cows 12 to exit from the moving platform 13 when the gates 22 are opened. On the opposite side of the fixed platform 16 are a second set of rotatable gates 24 similar to the gates 17 which are in their second position preventing the cows from walking upon a platform holding area 25 having a plurality of rotatable wheels 26 for a platform to roll upon. On either side of the platform areas are fixed floors 27 for the cows to exit upon completion of the milking operation. The cows 12 are fed onto the platform 16 and into the individual stalls formed by the railings 18 where they can feed from the buckets 20, and have their udders washed and aired through the udder washer 21 and in which the shuttle platform 13 may be moved on the wheels 26 to a second or milking position 30. The second and parallel shuttle platform 31 is illustrated in it's milking position. The two platforms 13 and 31 can thus alternately shuttle between the loading positions and the milking positions so that one can be loaded with cows while the other one is having the cows milked and as the loaded platform comes to the milking station, the cows thereon can be connected for milking while the cows on the opposite platform can be disconnected and shuttled back to the loading position where they are unloaded by the rotation of the gates 22. The gates 22 all work simultaneously to allow all the cows to be unloaded at the same time as do the gates 17 and 24. A wall 32 separates the loading end of the building 33 from the milking end of the building 30 and includes openings 33 and 34 for the shuttling platforms to move therethrough, as well as a door 35 through which an operator can walk. The openings 33 and 34 include blowers 36 placed thereover for delivering a curtain of air directly over the doorways 33 and 34 to prevent the entrance of flys and insects into the milking area. The door openings 33 and 34 each have doors 37 that slide to close the openings 33 and 34. The milking end of the station 30 has a continuation of the pair of tracks 25 having a plurality of rollers 26 thereon for the platforms to ride on and has a sunken area 38 which is the milking station in which the operator works for connecting the cows up to milking machines for milking the cows on either of the platforms. In this view the second platform 31 is illustrated at the milking station. A motorized milking chair 40 is illustrated in the milking station 38, and includes a milking chair or stool 41 connected thereto which is connected by linkage to a base 42 and rides on a track 43. This milking chair allows the operator to be moved back and forth and to swing from one side to the other without continuously walking around and repeatedly standing up and sitting down for connecting and disconnecting the teat cups of the milking machine. This stool is powered from an overhead boom 44 connected to the building 11 by boom support 45 with a hanging hydraulic or electrical power cable 46 which drives the hydraulic units 47 and 48 for actuating the movement of the chair 41 upon a central shaft 50 held by an upright frame 51. The unit is propelled within the milking station sunken area by a motor 52 driving wheels. The seal 41 can rotate on a pinned shaft 53, as well as on a shaft 50, and a rubber wheel 54, on the like, allows the seat additional support on the base frame 42 and rotates around the base frame 42 as the seat is moved from one side to the other of the milking station.

It should of course be realized that the milking chair 40 can be any type of chair desired and the invention does not require a chair at all. The actual milking machines can be connected through a plurality of pipes 54 connected through building walls 11 with a large milk storage container located outside of the actual milking area 30 so that the operator can grab a cluster of teat cups and connect them and disconnect them from the pipes 54.

In the operation of the system, the gates 22, 17, 24 are actuated by the position of the platforms as will be described in more detail. Actuation of the entire system however can be operated through manual switches by an operator and may include means for counting the number of cows proceeding through the loading gate 15. Counter 56 has a rotatably biased, rotatably extending post 57 with a cow engaging portion 58 which is bumped by each cow as it passes through and then rotates back to the initial position for counting the cows. A control box 60 has a plurality of switches 61 and a red and green light signal 62 that is mounted atop a vertically extending pole 63. Box 60 may contain microswitches to activate different portions of the milking parlor 10 by a standing operator and the lights 62 signals when the platform 13 and 31 is loaded and ready to be shifted from the loading position to the milking position 30.

Plaform 13 includes a grill work 64 which allows the excrement from the cows to fall into channels where they are cleaned as will be discussed in more detail. It should be noted at this point that platform 13 is separated in two elongated platform sections, 65 and 66, separated at 67. This allows one platform section 65 to be shifted parallel to the other platform section 66. This is accomplished by hydraulic cylinder 68 which is mounted to a supporting bracket 70 which is rigidly attached to the platform section 66 with a hydraulic cylinder driving rod 71 rigidly attached to bracket 72 attached to platform section 65, thus the actuating cylinder 58 is attached to platform 66, while the rod is attached to platform 65 and actuation of the cylinder rod will move platform section 65 relative to platform section 66. Actuation is accomplished by the cylinder 68 coming in contact with a box 73 having a protruding nozzle 74 for each platform 13 and 31. It should be observed that the railings 18 for the stalls are free telescoping members so that movement of the platform 65 relative to platform 66 will pull the vertical rods 75 holding the telescoping railings 18 which will telescope in and out to adjust their length and also the depth of the stall. This adjustment allows adjustments to be made for different size cows which are normally batched according to size so that when the cows are shifted to the milking station 30 they will be properly adjusted to be connected to the milking machines. The shifting of the platform 65 relative to the platform 66 also actuates the gates 22 to open these gates when platform 65 is shifted over the maximum pull of the rod 71 as will be described in more detail. Shifting of platform section 65 relative to section 66 when opening gates 22 also acts to give the cows in the stalls a shift outwards to help clear the stalls.

Returning to the milking station 30 it should be observed that the railings or pipes 54 which are adapted to receive the milk from the cluster of milk lines also acts to maintain the cows in place and might include a shield 76 to protect the milking station operator while connecting and disconnecting the milking machines from the cow. Shield 76 is located to also prevent injury to the cows and is supported from above by pipe 54. Shield 76 can be movable vertically to different positions, if desired.

Pads 29 located in each stall on the platforms 31 and 33 actuate pressure switches which can directly actuate air valve. If all of the air valves are connected in series a completed circuit will be accomplished by all of the cows being loaded in the stalls for one platform and this can be utilized to start the platforms only when fully loaded without the aid of the operator. Pressure plates 29 can also be utilized to actuate the udder sprayers 21 as each cow gets into position in the stall, and can be used to actuate the gate 17 and 24 individually as each is loaded.

FIG. 2 illustrates the platform 13 after being returned to the loading area 33 for unloading the cows 12 and in which the gates 22 have been opened by rotation on their bases 23 which also hold the feeding pails 20. As can be seen from this view, the cylinder 68 is attached to the bracket 70 and pulls the bracket 72 to shift platform section 65 relative to platform section 66. This also pulls the vertical members 75 and causes the railings 18 to telescope to their shortest position. Gates 24 have been rotated to their closed position. This view illustrates one cow 12 stepping out onto platform 27 within the building 11 and has the guide railing 63 along with the control box 60 with the switches 61 and lighting unit 62, as well as the gates 15 and shows the wall 32 separating the milking station 30 having the track 25 with the wheels 26 thereon. The shifting of platform section 65 relative to section 66 at the same time as opening the gates 22 is an important feature in that it makes the cows shift forward and starts them unloading. Normally cows tend not to move until nudged in some manner which usually requires an operator to unload a system for prompt unloading.

FIG. 3 more clearly shows the operation of the shuttling platforms by cutting away portions of the apparatus and separating the platform 13 from its track 25 having the wheels 26 mounted to steel channel members 80 mounted in the concrete floor 81, with the loading platform 16 on one side and the unloading platform 27 on the opposite side of the sunken track 25. The entire platform 13 rides on the wheels 26 and may be shifted relative to each other by having the platform section 66 made of steel channels 82, or the like, which have a shift 83 rigidly attached thereto and extending through a slot 84 in a channel 85 on the platform section 65. Shaft 83 has a pair of rubber wheels 86 rotatably attached thereto for riding in the channels 85 of platform section 65 and includes a pair of stop members 87 for stopping the movement of the wheels 86 in each direction. Actuation is of course by the cylinder 68 mounted in the mounting bracket 70 with the rod 71 attached to the bracket 72 which is attached to the platform section 65. The platform section may include two or more shafts 83 and wheels 86 for producing the necessary strength and support to hold the pairs of platform section together. This view also illustrates the forming of a channel 90 for excrement from the cows to fall into by falling through the grill 64 into the channel 90. The excrement is swept away by the movement of the platform 13 into a ditch section 91 having an auger 92 therein driven by a motor 93 which shifts the waste for disposal. A pair of sweepers (FIG. 13) push the disposable organic material by the movement of the platform and are mounted so as to wing in one direction while riding over any material in the channels 90 by to be blocked from swinging in the other direction so that they engage and sweep only when the carriage is moving in one direction even though the flaps are mounted at each end for sweeping both sides of the ditch 91.

The driving system for driving the platforms is illustrated in FIGS. 3, 4 and 5 and includes a motor 95 which is a hydraulically actuated motor but could of course be a pneumatic or electric motor if desired. It is desirable to avoid the use of electricity on the platforms 13 and 31 and wherever possible to avoid electrical shock within the operation of the parlor. In this case a pair of tubes cables 96 are fed to the electric motor 95 for actuation thereof upon the actuation of a solenoid valve 97. The motor 95 is reversible so that upon the proper actuation of the solenoid valve 97 the motor can be driven in either direction desired by the operator. The motor is attached by a belt 98 to a pulley 100 which is attached to a rotatable wheel 101. The wheel 101 can include a wheel with a balloon tire mounted thereon and rides against the bottom of the platform 102 to drive the platform in accordance with the direction of rotation of the motor 95. The wheel 101, pulley 100 and a rotatable shaft 102 which the pulley 100 is attached to for rotation therewith and which is mounted to bearings 103 all ride on a movable support member 104 which is pinned with pins 105 to brackets 106 at one end and has a spring 107 mounted at the opposite end for spring biasing the wheel 101 against the bottom 102 of the platform 13 for providing the force against the platform for driving the platform.

FIG. 4 illustrates a slight modification in that the spring 107 is replaced by a hydraulic cylinder actuating unit 110 having a rod 111 connected to a bracket 112 attached to the supporting member 104 and which may be actuated to engage or disengaged the wheel 101 with varying amounts of force depending upon the actuation of the cylinder 110. This simplified drive system allows the platforms to be driven in either direction while preventing any power units from having to be attached to the platform 13 so that external connections for driving the platform 13 are unnecessary. It should be realized that other drive systems, such as using air actuated ram jets to drive the platforms between locations is contemplated as being within the scope of the invention. In the case of ram jets they could be actuated by all of the pressure plates 29 (FIG. 1) being actuated in series to fire the jet automatically.

FIGS. 6, 7 and 8 illustrate the operation of the udder washers, excrement handling system and connections for the cylinder 68. The connecting valves for the platforms 13 and 31 include a cone-shaped male connector 115 connected to the platform 13 and including a ball checkvalve having a ball 116 and spring loaded by a spring 117 in the spray pipes 188. The connector 115 engages a cone-shaped female connection 120 located at the end of the tracks. Platforms 13 are rising on and include a one-way ball checkvalve having a ball 121, spring biased by spring 122 so that when the platform 13 comes into contact with the end 123 of the track 25 the connecting portion 115 will interconnect to portion 120 and drive the ball 121 against the spring 122 to allow the entrance of air or liquid sprays which force the ball 116 against the spring 117 to allow gas or liquids to pass through the udder sprayer pipe 118. As can be seen from FIG. 7, there are a plurality of udder spray pipes 118 connected to a plurality of nozzles 115 and also to the udder spray head 21 which can spray a mist of preparation solution such as a disinfectant as well as air to remove excess water from cows' udders. The spray enters individual circular chambers 124, circulates around and out perforations 125 and spray head 121 and may pass into the next connecting pipes 126 which connect one spray head to the next spray head all the wall to the opposite end of the platform where a second set of nozzles 115 are connected to the pipes. In this way, one of the pipes 115 may be utilized to spray air while the second may be utilized for spraying a liquid, as desired. The center nozzle 129 is for air and includes vanes to generate a vortex in the air. The grates 64 are placed over the pipes 118 and 126 for the cows to walk upon and allows materials to fall therebetween around the pipes 118 and 126. It is also contemplated that hoses wound or spring loaded reels could connect the platforms to the air liquid supplies without departing from the spirit and scope of the invention. The stall rails 18 are shown in FIG. 7 in each of two telescoped positions of the platform sections 65 and 66 depending upon the position of the driving rod 71 actuated by the cylinder 68. The gate 22 is also illustrated in two positions with the cow 12 feeding from the feed pail 20.

FIGS. 8 and 13 illustrate the cleanup operation for the solid waste and the drive mechanism. Platform 13 is seen riding on the wheels 26 driven by a pair of wheels 101 driving the platform from either end of the track with each wheel 101 being driven by its motor 95 and loaded upon a spring loaded support member 104 which is pinned with a pin 105 to a bracket 106 at one end and spring biased with a spring 107 at the opposite end. Motor 95 is connected to a fluid drive line 96 connected to solenoid valves 97 which allow actuation through a remote micro-switch actuating the solenoid 97. Nozzle 115 connected to pipes 118 and to the chambers 124, covered with a perforated cover plate 21 are also illustrated as is the waste conveying trench 91 having an auger 92 driven by a motor 93. Waste is driven into the auger trench 92 by means of sweeper 130 located on either end of the platform 13 and pinned with pins 131 having a shoulder 132 which allows the sweeper 130 to flip up and ride over materials when the platform is moving in one direction and then to flip down and maintain their position for scraping solid waste material when the platform moves in the opposite direction so as to drive waste materials into the trench 91 without pushing them in the opposite direction.

FIGS. 9, 9A, and 10 and 10B, illustrate the mechanism for actuating the gates 21 through their base 23, while FIG. 12 illustrates the actuating mechanism for gates 24. In FIGS. 9, 9A, and 10 and 10B, a portion of gates 22 attached to base 23 is illustrated in two separate positions with a fluid actuated cylinder 135 having a driving rod 136 in its two positions, first with the ramp 137 disengaged from the geared surface 138 and in a second position with the ramp surface 137 engaged with the gear 138. Gear surface 138 gear teeth only around a portion of a driving disc 140 which is fixedly attached to shaft 141 for driving the shaft 141 when the ramp 137 engages the gears 138. Ramp 137 has a surface 142 attached thereto back from the teeth 143 of the ramp 137 for lifting a latching member 144 when the hydraulic cylinder 135 is in the position shown in FIG. 9A which in turn lifts a protrusion 145 from an opening 146 in the disc 140. As can be seen from FIGS. 10 and 10A there are a pair of openings 146 for each driving surface 140 for latching the driving surface in two different positions. Latching member 144 is pinned with a pin 147 to holding bracket 148 and is curved to ride over the linkage member 150 pinned at 151 to member 140. Lever 151 is connected with a pin 152 to an actuating arm 153 which is in turn connected to shaft 141 of a second gate 122 so that only one rack 137 and member 140 would engage surface 138 as required to drive all gates simultaneously. A second member 154 is pinned also by pin 152 and drives another member 153 on the next gate's shaft 141.

FIGS. 9 and 9A illustrate the carriage in two positions, while FIGS. 10 and 10A illustrate the same apparatus in two positions. All of the parts are on the carriage except for the cylinders 135 with the racks 137 and lifting members 142 which are attached to the floor or base of the milking parlor. In operation, the platform comes to its loading position 33 having the gates 22 closed but still loaded with the cows after completion of the milking operation. The cylinder 68 (FIGS. 1, 2 and 3) actuates its rod 71 to shift the platform portion 65 relative to platform section 66 (FIG. 1) which operation simultaneously actuates the hydraulic cylinder 135 to engage the rack 137 teeth 143 with the teeth 138 of member 140 and as platform section 65 and platform 13 is moved by the cylinder rod 71, the member 140 is rotated on the fixed rack 137 to open the gates 22 to let the cows leave the stalls and simultaneously the stalls are shortened by being straightened with the rails 18 telescoping inward. Once the cows have unloaded from the stalls, the operator actuates the hydraulic cylinder 68 and 135 through the use of solenoid valves such as illustrated at 155 operated by a microswitch 156 which is connected to the switching panel 60 (FIG. 1). Once the cylinder 68 returns the platform section 65 of platform 13 to its original position relative to the platform section 66, the gates will again be closed by the member 144 being rotated by the rack 137 and the rack 137 can be lowered by the hydraulic cylinder 135 which allows the latching on member 144 to fall upon member 140 and to engage the next latching opening 146 to hold the gates 22 in a latched position during the movement between loading position 33 and the milking position 30 of the platform 13.

The gates 24 are actuated in a similar manner as illustrated in FIG. 12 except that a rack 160 is fixedly attached to the base of the milking parlor and engages teeth 161 of a disc member 162 each time the platform comes to the end of the loading position 33. The disc member 162 is fixedly attached to shaft 168 which is connected to the gates 124 and has a linkage 164 pinned thereto by pin 165 which connects to an arm 166 fixedly attached to the next gate's shaft 163. Linkage 164 is connected by pin 167 which also connects the next linkage 164 for connecting the next gate. Thus the entire actuating mechanism is attached under the platforms so that each time platform comes to the end of its track, the teeth 161 engage the rack 160 shifting the gates 24 from a closed to an open position and as soon as the platform pulls away from the loading position 33 the teeth 161 which ate still engaged with the rack 160 are rotated in the opposite direction to close the gates 24 until the platform returns. By the operation of several solenoid valves which are actuated through microswtiches in the switchboard 60 the entire apparatus can be operated by the actuation of the drive motor for driving the platforms. The actuation of the cylinder 68 is to adjust one platform section 65 relative to a second platform section 66 while opening and closing gates 22.

It should be noted that the operation of the gates 22 takes place as the platform section 65 approaches its maximum movement relative to platform section 66 so that adjustments can be made between platform sections 65 and 66 adjusting the depth of the stalls without opening the gates 22. The gates 24 are of course opened and closed automatically by the platforms arriving at the loading station 33 by the rack 160 attached to the platform engaging driving mechanism for the gates.

Other features such as the blowers 36 may also be actuated from the control panel 60 if desired, without departing from the spirit and scope of the invention.

The complete operation of the milking parlor is set forth in the flow diagram of FIG. 11 starting with the cows in the cow holding pen and proceeding through a series of steps ending with the step of recycling shuttling platforms. The loading area side gates 22 are closed as the platform docks in the loading area, and the loading area entry gates 15 are opened and the cows pass by the cow counting mechanism 58 to count the number of cows proceeding into the cow loading area. As the proper number of cows enter the cow loading area, the loading area gate 15 is closed and the signal light 62 can be switched on to signal that a proper number of cows has been loaded to the platform. Platform section 65 then is shifted forward by actuation of the hydraulic cylinder 68 to adjust the stalls for the cows to the proper size of cow being fed into the platforms.

It should be observed that the cows are normally milked in batches with cows of similar size so that the adjustment of the platform 65 can be adjusted for each batch of cows of similar size so that the cow udders are at the approximate correct position on the platforms for connecting the milking machines. The platform exit gates are also in a closed position at this point but the loading area side gates or the particular area being loaded are in their open position for the cows to load onto the platform. Once the cows are loaded onto the platform the cow udders are washed and the loaded shuttling platform is actuated to move from the loading position 33 to the milking position 30 which actuates the loading area side entry gates to their closed position until the trolley returns. The milking room door 37 is opened and the trolley moves into the milk room milking position 30 and the milk room door 37 may be closed during the milking operation. The air from the blower 36 blows over the opening 39 to prevent the entry and exit of flies and other insects. Once the loaded platform docks at the milking station, the udder preparation is sprayed upon the udders for cleaning them and air is blown over the udders to remove excess water from the cows' udders and massage the udders in preparation for milking the cows. The milking machines are then connected to the cows and actuated until the milking operation is completed at which time the milking machines are disconnected and the cow udders are sprayed with a teat dip solution spray. The milk room door 37 may be opened if it was closed during this operation and the platform undocked and moved back to the loading area. Thus, as can be seen, a pair of platforms is alternately shuttling back and forth between the milking and loading stations to keep the operator continuously working with one shuttling platform or the other while a second operator is loading and operating the platforms from the loading position utilizing a control panel 60 of FIG. 1. The platform next docks to unload at which time the cylinder 68 in FIG. 1 is actuated to move platform section 65 relative to platform section 66 and platform 13 to its full shifted position so that the gates 22 are opened while at the same time shortening the individual stalls encouraging the cows to promptly exit the platform stalls onto the unloading platform 27 to eject the cows, at which point the cycle begins against again.

It is of course understood that the opposite platform 31 is operating in the same manner alternately with the platform 13 so that the operation is substantially continuous even though the cows are being operated in batches on the shuttling platforms.

A cow parlor has been disclosed herein but it should be realized that other embodiments and equivalents are anticipated as being within the spirit of the invention and changes such as having the wheels 26 connected to the platforms are contemplated. The batch loading and unloading with the unloading being started by the shifting platform sections greatly increases the efficiency of the present parlor. This is enabled by the shuttling platforms to maintain a continuous operation which can be substantially automated. Variations in the drive mechanism such as with ram jets are also contemplated, and the present system can also be adapted for use to feed other parlor systems. Accordingly, the present invention is not to be construed as limited to the particular forms disclosed herein since these are to be regarded as illustrative rather than restrictive.

We claim:

1. A method for milking cows comprising the steps of a. directing a plurality of cows onto a movable shuttling platform;
 b. moving said shuttling platform in one direction between a loading position and a milking position;

c. attaching a milking unit to and milking each cow on said shuttling platform;

d. returning said shuttling platform to its loading position by moving said shuttling platform in a second direction opposite to said first direction;

e. directing a plurality of cows onto a second movable shuttling platform while said cows on said first movable shuttling platform are in a milking position;

f. moving said second shuttling platform to a second shuttling platform milking position; and g. returning said second shuttling platform to its loading position by moving said shuttling platform in a second direction opposite to said first direction whereby cows may be milked on a continuous batch basis.

2. A method in accordance with claim 1 having the step of counting said plurality of cows being directed onto a movable shuttling platform.

3. The method in accordance with claim 1 in which the step of directing a plurality of cows onto a movable shuttle includes directing said cows into individual feeding stalls on said platform.

4. The method in accordance with claim 3 having the step of moving one elongated portion of each shuttling platform relative to the second elongated portion of each shuttling platform and telescoping the railings for said stalls in accordance with the size of the cows being directed into said stalls on said movable shuttling platforms.

5. The apparatus in accordance with claim 4 including the step of unloading cows from said shuttling platform upon said shuttling platform returning to said loading position.

6. The method in accordance with claim 5 in which said step of unloading said cows includes shifting of said one elongated portion of each shuttling platform relative to the second elongated portion of each shuttling platform to partially eject cows from said platform.

7. The apparatus in accordance with claim 1 having the step of spraying said loaded cows' udders while on said platform.

8. The method in accordance with claim 7 including docking said platform to souple spray hoses to said platform for spraying said cows loaded on said platform.

9. The method in accordance with claim 1 including the step of sweeping cow manure into a ditch with wipers attached to said shuttling platforms.

10. The method in accordance with claim 1 including the steps of driving said shuttles over a track of wheels with a driving wheel located beneath said shuttles.

11. The method in accordance with claim 1 in which the step of directing a plurality of cows onto a movable platform includes moving said plurality of cows onto a loading platform opening into a plurality of individual feeding stalls on one said platform.

12. A milking system comprising in combination:

a. a first movable shuttle platform having a loading position for loading a plurality of cows onto said shuttle platform and a milking position for milking cows on said shuttle platforms and being adapted to move between said positions;

b. a second movable shuttle platform having a loading position for loading a plurality of cows thereonto and a milking position for milking said cows thereon and being adapted to move between said positions; said first and second movable shuttle platforms being located in a spaced relationship to each other;

c. means for directing cows onto one said movable shuttle platform at a time when said one platform is in a loading position;

d. means for moving said first and second movable shuttle platforms alternately from said loading to said milking position and back to said loading position; and e. a milking station located adjacent said first and second shuttle platforms milking positions whereby cows on both said platforms can be milked by the same operator.

13. The apparatus in accordance with claim 12 in which each movable shuttling platform includes a plurality of individual stalls having telescoping dividing rails for holding each individual cow therein.

14. The apparatus in accordance with claim 13 including a mechanism for shifting a portion of each movable shuttling platform relative to a second elongated portion of each movable shuttling platform for varying the angle of each stall on each movable platform in accordance with the size of the cows being loaded and for assisting in ejecting cows during unloading.

15. The apparatus in accordance with claim 14 in which each movable shuttling platform includes an unloading gate for unloading cows from each platform stall at said loading position and eject cows.

16. The apparatus in accordance with claim 15 in which said mechanism for shifting a portion of each movable platform relative to a second portion includes means for actuation with the opening of said unloading gates to eject cows therefrom.

17. The apparatus in accordance with claim 15 in which the movement of each said platform section relative to the other platform section actuates the opening of the unloading gates for each stall along each said platform.

18. The apparatus in accordance with claim 17 in which two sets of gates are located on a platform area adjacent each shuttling platform which gates are opened only on the side having a platform in the loading position.

19. The apparatus in accordance with claim 17 in which said gates on said loading platforms have an actuating mechanism actuated by the shuttling platform docking at the loading position.

20. The apparatus in accordance with claim 12 in which said milking station includes a power actuated milking stool adapted to position the operator next to either of said platforms in the milking position and having means to move said stool along said milking station.

21. The apparatus according to claim 12 in which each said platform includes a plurality of udder sprayers and air nozzles for spraying the cows on said platform and directing air onto the udders.

22. The apparatus according to claim 21 in which said air nozzles on said platform includes vanes for generating a vortex of air toward the cows' udders.

* * * * *